US011229331B2

(12) United States Patent
Taguchi

(10) Patent No.: US 11,229,331 B2
(45) Date of Patent: Jan. 25, 2022

(54) TOILET SEAT STRUCTURE FOR AIRCRAFT LAVATORY UNIT

(71) Applicant: The Yokohama Rubber Co., LTD., Tokyo (JP)

(72) Inventor: Yuji Taguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/767,539

(22) PCT Filed: Nov. 27, 2018

(86) PCT No.: PCT/JP2018/043547
§ 371 (c)(1),
(2) Date: May 27, 2020

(87) PCT Pub. No.: WO2019/107347
PCT Pub. Date: Jun. 6, 2019

(65) Prior Publication Data
US 2021/0169281 A1 Jun. 10, 2021

(30) Foreign Application Priority Data
Nov. 28, 2017 (JP) .............................. JP2017-227603

(51) Int. Cl.
*A47K 13/04* (2006.01)
*B64D 11/02* (2006.01)

(52) U.S. Cl.
CPC .............. *A47K 13/04* (2013.01); *B64D 11/02* (2013.01)

(58) Field of Classification Search
CPC ........ A47K 13/04; A47K 11/00; B64D 11/02; B60R 15/04; B61D 35/00; B63B 29/14
See application file for complete search history.

(56) References Cited

U.S. PATENT DOCUMENTS 1,469,503 A * 10/1923 Florey .................... A47K 13/04
 4/248
1,597,414 A * 8/1926 Leslie .................... A47K 13/04
 4/248

(Continued)

FOREIGN PATENT DOCUMENTS

| DE | 200 15 581 | 1/2001 |
| JP | S54-152551 | 10/1979 |
| JP | 2016-169004 | 9/2016 |

OTHER PUBLICATIONS

International Search Report for International Application No. PCT/JP2018/043547 dated Jan. 22, 2019, 2 pages, Japan.

*Primary Examiner* — J C Jacyna
(74) *Attorney, Agent, or Firm* — Thorpe North & Western

(57) ABSTRACT

Provided is a toilet seat structure for an aircraft lavatory unit. A cushion block is formed of a single band-like body that has a band-like shape extending with a predetermined width along an entire circumference of a toilet seat in a circumferential direction. The band-like body has an elongated cross-sectional shape cut along with a plane orthogonal to the extension direction and includes: a flat upper surface; a flat lower surface; and inclined surfaces provided on both sides in the width direction. The band-like body has the upper surface that is attached to a lower surface of a body plate portion with an adhesive and inclined surfaces that form an obtuse angle with respect to the lower surface of the body plate portion.

13 Claims, 11 Drawing Sheets

(56) References Cited

U.S. PATENT DOCUMENTS

| | | | | |
|---|---|---|---|---|
| 1,628,277 | A * | 5/1927 | Schacht | A47K 13/04 |
| | | | | 4/248 |
| 1,972,076 | A * | 9/1934 | Cross | E03D 9/05 |
| | | | | 4/217 |
| 2,109,829 | A * | 3/1938 | Roe | A47K 13/04 |
| | | | | 4/248 |
| 2,873,454 | A * | 2/1959 | Phillips | A47K 13/04 |
| | | | | 4/248 |
| 3,331,085 | A * | 7/1967 | Potosky | A47K 13/00 |
| | | | | 4/245.7 |
| 6,226,807 | B1 * | 5/2001 | Rozenblatt | B64D 11/02 |
| | | | | 4/313 |
| 2006/0096015 | A1 * | 5/2006 | Lim | A47K 13/24 |
| | | | | 4/300.3 |
| 2008/0034483 | A1 | 2/2008 | Schanz | |
| 2008/0235858 | A1 | 10/2008 | Schanz | |
| 2013/0219604 | A1 * | 8/2013 | Gregg | E03D 9/00 |
| | | | | 4/300.3 |
| 2016/0289939 | A1 * | 10/2016 | Hardwick | E03D 11/16 |

\* cited by examiner

TOILET SEAT STRUCTURE FOR AIRCRAFT LAVATORY UNIT

TECHNICAL FIELD

The present technology relates to a toilet set structure for an aircraft lavatory unit.

BACKGROUND ART

A toilet installed in an aircraft lavatory unit adopts a system of sucking waste in a toilet body into a discharge pipe by negative pressure. The shape of the toilet body is remarkably different from a toilet body including a bowl portion for a residential building, has a simple bowl shape, and is made of metal or a resin.

Thus, the toilet installed in the aircraft lavatory unit has a bowl-shaped toilet body supported by a support portion above a floor and is provided with a shroud that covers the toilet body and the support portion.

The shroud includes: a peripheral wall portion that covers a periphery of the toilet body and the support portion; and a flange that has an annular plate shape and is placed on an upper end outer circumferential plate portion of the toilet body. The toilet seat is placed on the flange.

Further, in order to suppress sounds such as rattling of the toilet seat during flight and sound generated by lowering the toilet seat, a plurality of cushion blocks that are brought into elastic contact with an upper surface of the flange are attached on a lower surface of the toilet seat at an interval in a circumferential direction of the toilet seat.

In recent years, the number of cases of toilet seat breakage has increased.

It is thought that breakage is caused by a user of the aircraft lavatory unit who places his or her foot on a toilet seat with a shoe on or a user or a cleaner who stands on a toilet seat with shoes on.

Further, the cushion blocks attached on the lower surface of the toilet seat each have a cylindrical shape or a box-like shape, and base ends of the cushion block are corner portions with respect to the lower surface of the toilet seat. Thus, dirt in the vicinity of the corner portions of the base ends of the cushion block is difficult to remove, and some improvement has been demanded for improving the efficiency of clean-up work.

SUMMARY

The present technology provides a toilet seat structure for an aircraft lavatory unit that is advantageous in preventing the breakage of the toilet seat and advantageous in improving the efficiency of cleaning the lower surface of the toilet seat.

The present technology includes: a toilet body including a bowl portion; a support portion configured to support the toilet body above a floor; a shroud including: a peripheral wall portion configured to cover a periphery of the toilet body and the support portion and a flange having an annular shape placed on an upper end outer circumference of the bowl portion; and a toilet seat having an annular shape placed on the flange, the toilet seat having a lower surface to which a cushion block is attached, the cushion block having a band-like shape, having an upper surface attached to the lower surface of the toilet seat, and positioned almost in an entire area of the toilet seat in a circumference direction, and in a state in which the cushion block is attached to the lower surface of the toilet seat, a section of an outer surface of the cushion block that is brought into contact with the lower surface of the toilet seat forms an inclined surface forming an obtuse angle $\theta$ with respect to the lower surface of the toilet seat.

Further, in the present technology, the cushion block may be formed of a single band-like body having a band-like shape extending with a predetermined width along an entire circumference of the toilet seat in the circumferential direction, and the inclined surface may be provided to each of both sides of the band-shaped body in a width direction.

Further, in the present technology, the toilet seat may include: a body plate portion extending annularly with a width and facing the flange; an inner plate portion protruding downward from an inner circumferential end of the body plate portion and extending along the body plate portion; and an outer plate portion protruding downward from an outer circumferential end of the body plate portion and extending along the body plate portion, the lower surface of the toilet seat may include: a lower surface of the body plate portion; an inner surface of the inner plate portion; and an inner surface of the outer plate portion, the cushion block may be formed of a single band-like body having a band-like shape extending along an entire circumference of the toilet seat in the circumferential direction, the band-shaped body may include: a flat upper surface attached to the lower surface of the body plate portion; an inner inclined surface attached to the inner surface of the inner plate portion; an outer inclined surface attached to the inner surface of the outer plate portion; and a flat lower surface, and the lower surface of the band-shaped body may form the inclined surface forming an obtuse angle $\theta$ with respect to the inner surface of the inner plate portion and the inner surface of the outer plate portion of the toilet seat.

Further, in the present technology, the cushion block may be formed of a plurality of divided band-like bodies disposed at an interval in the circumferential direction of the toilet seat, the plurality of divided band-like bodies each may have an elongated shape having a length extending along the circumferential direction of the toilet seat and a width having a dimension smaller than the length in a direction orthogonal to the length, the interval between the plurality of divided band-like bodies in the circumferential direction of the toilet seat may have a dimension smaller than the width, and the inclined surface may be provided to an entire circumference around each of the plurality of divided band-like bodies being brought into contact with the lower surface of the toilet seat.

Further, in the present technology, projection portions may be provided to ends of one of the plurality of divided band-like bodies in a length direction, and groove portions may be provided to ends of another of the plurality of divided band-like bodies in the length direction, and of divided band-shaped bodies adjacent to each other in the circumferential direction of the toilet seat, a projection portion of the other of the plurality of divided band-like bodies may be positioned inward of a groove portion of the one of the plurality of divided band-like bodies.

Further, in the present technology, the cushion block may be formed of an inner band-shaped body having a band-like shape extending at a section close to an inner circumference of the lower surface of the toilet seat and an outer band-like body having a band-like shape extending at a section close to an outer circumference of the lower surface of the toilet seat, the inner band-like body and the outer band-like body may have a width in a direction orthogonal to a direction in which the inner band-like body and the outer band-like body extend, and the inclined surface may be provided to each of both sides of the inner band-like body in a width direction and to each of both sides of the outer band-like body in a width direction.

Further, in the present technology, both ends of the outer band-like body in an extension direction may be away from each other and face each other at sections close to parts at which the toilet seat is attached to an attachment portion of the shroud in a swingable manner, and the inclined surface may be provided to each of the both ends of the outer band-like body in the extension direction, in addition to each of both sides of the outer band-like body in the width direction.

Further, in the present technology, recess/protrusion portions may be provided to the lower surface of the toilet seat and the upper surface of the cushion block to be attached to the lower surface, the recess/protrusion portions extending in the circumferential direction of the toilet seat and engaged with each other.

Further, in the present technology, in the lower surface of the toilet seat, a recess extending in the circumferential direction of the toilet seat and opening downward is provided, and an upper part of the cushion block may be inserted in the recess, the lower surface of the toilet seat may include a bottom surface of the recess, and the lower surface of the toilet seat including the inclined surface forming an obtuse angle θ may be the lower surface of the toilet seat without the recess.

Further, in the present technology, the obtuse angle θ may fall within a range of from 115 degrees to 145 degrees.

Further, in the present technology, the obtuse angle θ may fall within a range of from 125 degrees to 135 degrees.

According to the present technology, even when a user of the aircraft lavatory unit steps on the toilet seat with feet, the cushion block is positioned almost in the entire area of the body plate portion in the circumferential direction, and the load can be received directly by the cushion block, which is advantageous in preventing the breakage of the toilet seat.

Further, at the time of cleaning, corner portions between a base end of the cushion block and the lower surface of the body plate portion are not present unlike the related art. The sections of the outer surfaces of the cushion block, which are held in contact with the lower surface of the toilet seat, form the inclined surfaces that form an obtuse angle θ with respect to the lower surface of the toilet seat. With this, dirt is less likely to adhere, and adhered dirt is easily removed, which are advantageous in improving the efficiency of clean-up work.

Further, according to the present technology, the recess/protrusion portions that are engaged with each other are provided to the lower surface of the toilet seat and the upper surface of the cushion block. Alternatively, the recess in which the upper part of the cushion block is inserted is provided in the lower surface of the toilet seat. With this, the adhesion surface between the toilet seat and the cushion block can be increased. Further, the structure in which the part of the cushion block and the part of the toilet seat are mechanically engaged with each other is adopted. When a load is applied in the width direction of the toilet seat, the load can be received by, in addition to the adhesion area between the toilet seat and the cushion block, the part of the cushion block and the part of the toilet seat that are mechanically engaged with each other. Thus, this is advantageous in preventing the peeling off of the cushion block and improving the durability of the cushion block.

Further, in the present technology, when the obtuse angle θ formed by the inclined surfaces, which are brought into contact with the lower surface of the toilet seat on the outer surfaces of the cushion block, with respect to the lower surface of the toilet seat, is limited to fall within a specified range, the boundary sections between the outer surfaces of the cushion block and the lower surface of the toilet seat are cleaned easily, adhered dirt is removed easily, and at the same time, the angle is preferable in the molding, handling, and durability of the cushion block.

DETAILED DESCRIPTION

Figure 1:
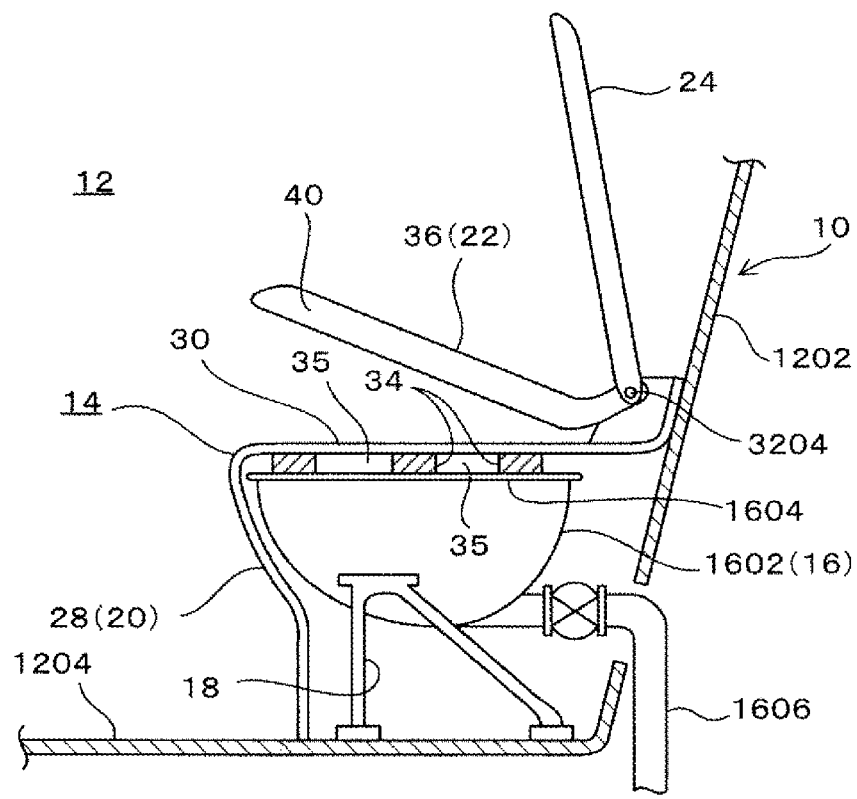
FIG. 1 is an explanatory diagram of a toilet in a side view, from which a part of a peripheral wall portion is removed.

Next, embodiments of the present technology are described with reference to the drawings.

First Embodiment

First, a first embodiment is described with reference to FIGS. 1 to 6.

As illustrated in FIGS. 1 to 4, a toilet 14 installed in an aircraft lavatory unit 10 in a lavatory 12 includes a toilet body 16, a support portion 18, a shroud 20, a toilet seat 22, a lid 24, and a cushion block 26.

The toilet body 16 is formed of metal and includes a bowl portion 1602 and an upper end outer circumferential plate portion 1604 on an upper end of the bowl portion 1602, which has an annular plate shape and extends outward of the bowl portion 1602, along an upper end outer circumference of the bowl portion 1602 with a constant width.

A discharge pipe 1606 that discharge waste in the bowl portion 1602 to the outside of the bowl portion 1602 by negative pressure is connected to a bottom portion of the bowl portion 1602.

The support portion 18 supports the toilet body 16 above a floor 1204 of the lavatory 12 and, in the present embodiment, supports the toilet body 16 at a section close to a back wall 1202 of the lavatory 12.

Figure 4:
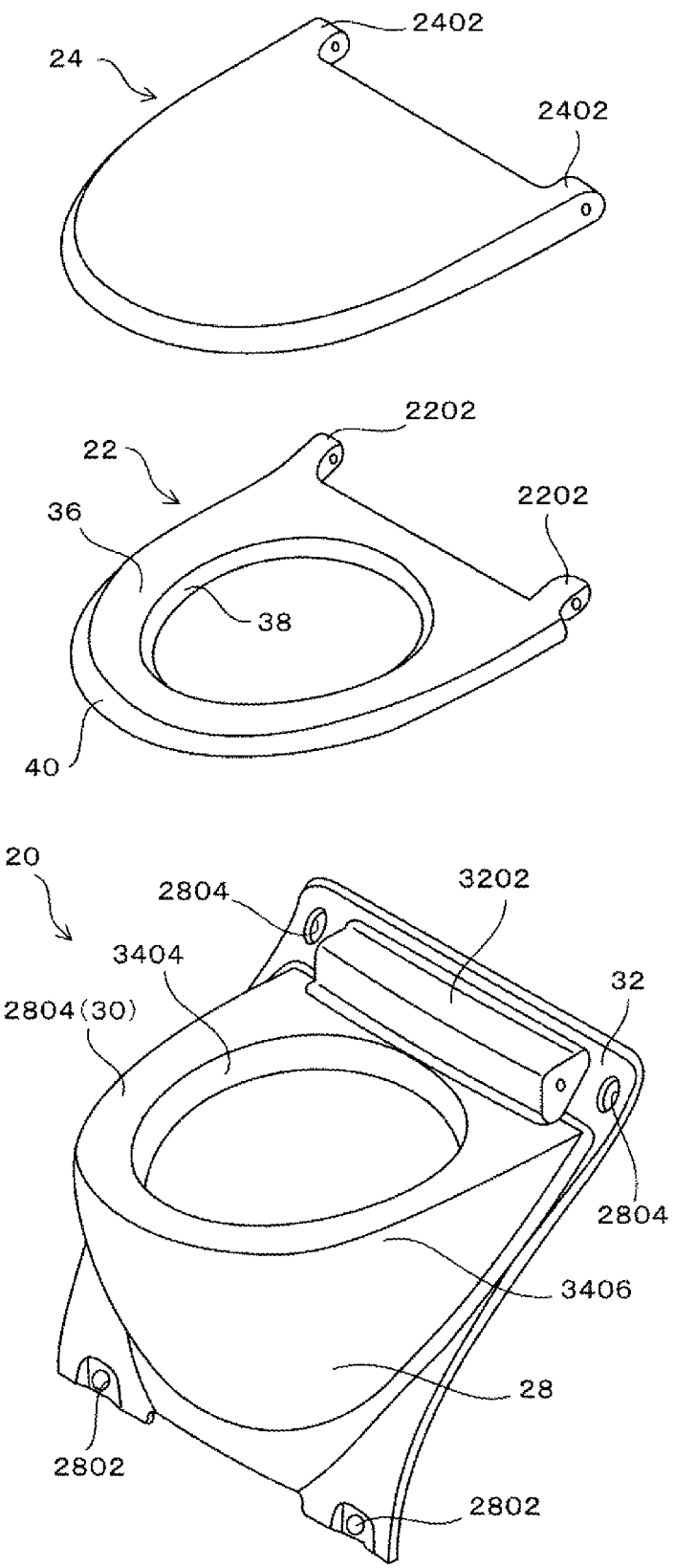
FIG. 4 is a perspective view of the lid, the toilet seat, and a shroud.

As illustrated in FIG. 4, the shroud 20 is formed of a synthetic resin and includes: a peripheral wall portion 28 that covers a periphery of the toilet body 16 and the support portion 18; a flange 30 that is connected to an upper end of the peripheral wall portion 28 and is placed on the upper end outer circumferential plate portion 1604; and an upper wall portion 32 that stands up from a rear end of the flange 30 positioned close to the back wall 1202. An attachment portion 3202 for the toilet seat 22 and the lid 24 is provided to the upper wall portion 32.

A lower end of the peripheral wall portion 28 is attached to attachment pieces 1206 of the floor 1204 of the lavatory 12, with bolts inserted through bolt insertion holes 2802 on both sides of the lower end of the peripheral wall portion 28, and the upper wall portion 32 is attached to the back wall 1202, with bolts inserted through bolt insertion holes 2804 on both sides of the upper wall portion 32. In this manner, the shroud 20 is installed in the lavatory 12.

A plurality of cushion blocks 34 are attached on a lower surface of the flange 30 at an interval in the circumferential direction of the flange 30.

The cushion blocks 34 have a predetermined thickness and are placed on the upper end outer circumferential plate portion 1604. Between the cushion blocks 34 between the upper end outer circumferential plate portion 1604 of the bowl portion and the lower surface of the flange 30, a plurality of air passageways 35 that communicate with an inner space and an outer space of the bowl portion 1602 are formed.

The aircraft lavatory unit 10 adopts a system of sucking waste in the toilet body 16 by negative pressure of the discharge pipe 1606. Thus, in a case where no measure is taken with respect to the negative pressure, at the time of sitting on the toilet seat 22, the negative pressure at the time of discharging waste acts on a human body seating portion to be drawn into the toilet body 16. In view of this, the air passageways 35 described above are provided, and thus the negative pressure acting on the human body seating portion to be drawn into the toilet body 16 is prevented from doing so.

Figure 2:
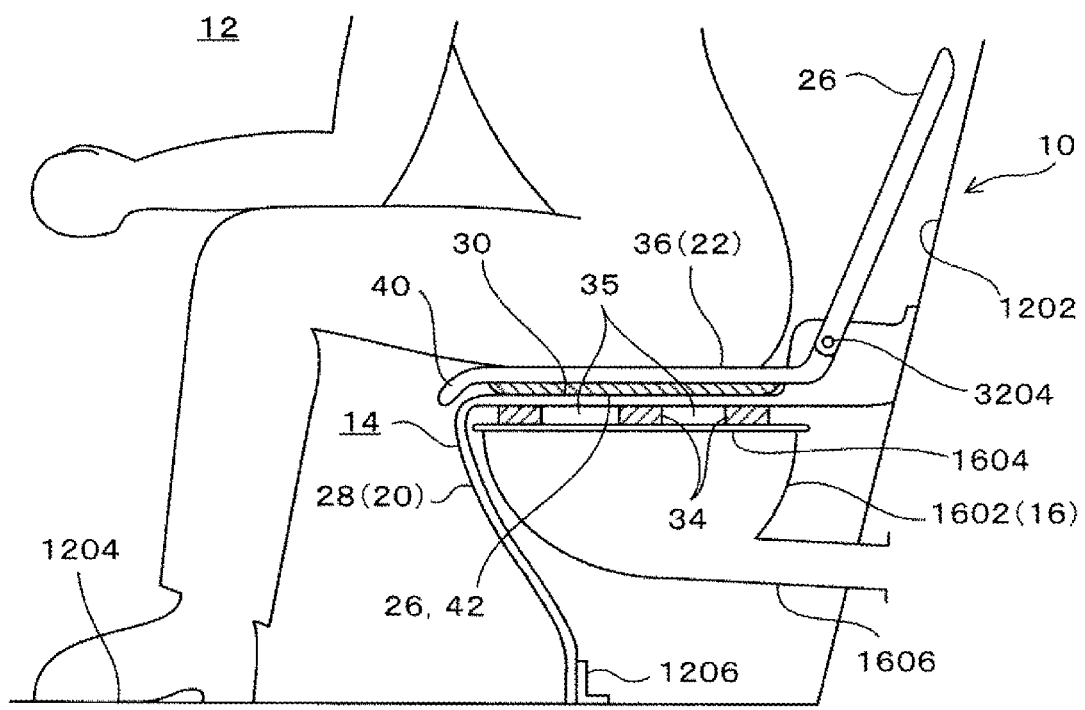
FIG. 2 is a diagram of the toilet in a state in which a user sits on the toilet seat in a side view, from which a part of the peripheral wall and an outer plate portion of a toilet seat are removed.

Forked portions 2202 and 2402 of the toilet seat 22 and the lid 24 are attached to the attachment portion 3202 in a swingable manner through the intermediation of a support shaft 3204 (see FIGS. 1 and 2).

Figure 5:
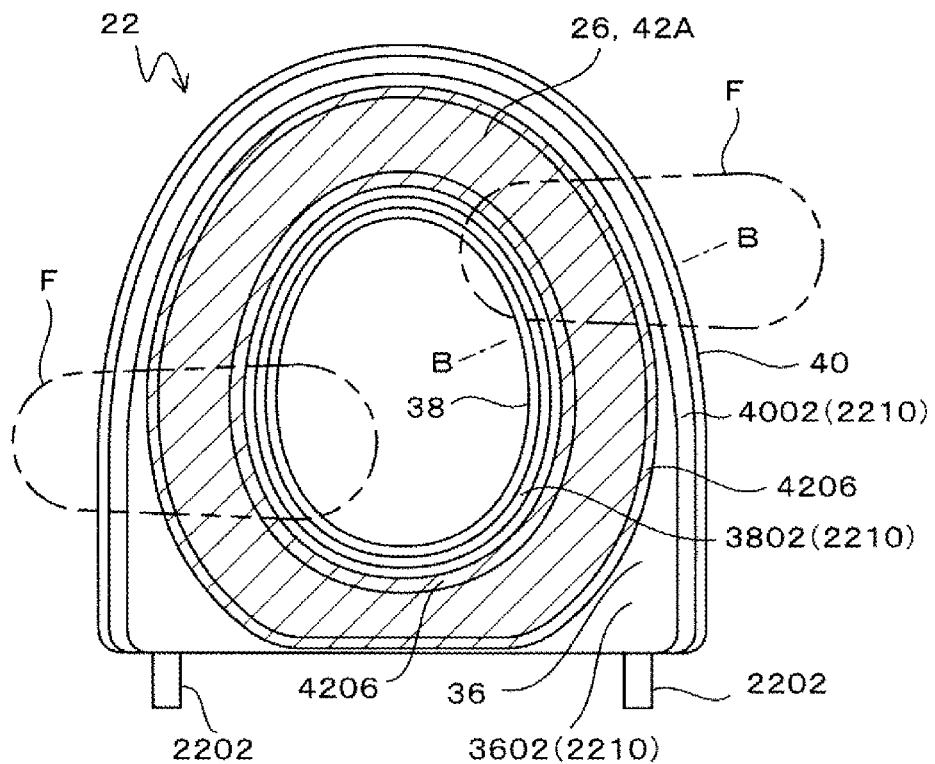
FIG. 5 is a diagram of a toilet seat according to a first embodiment, which is seen from below.
Figure 6:
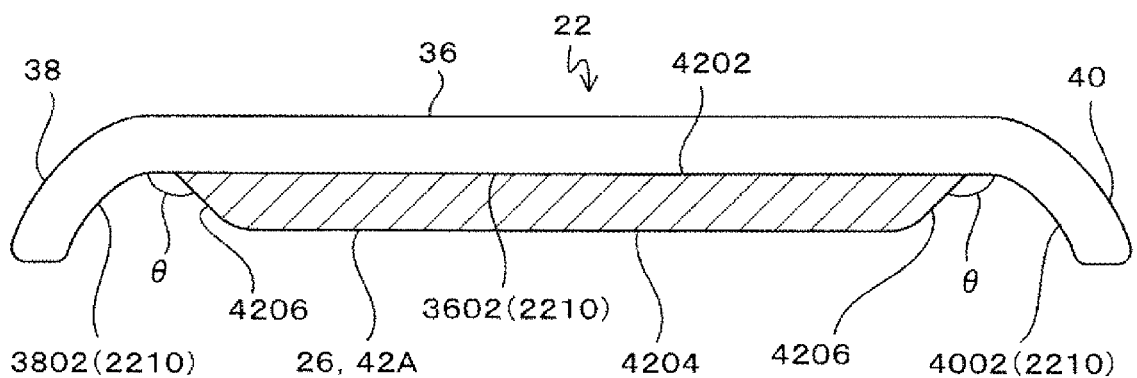
FIG. 6 is a cross-sectional view taken along B-B of FIG. 5.

As illustrated in FIGS. 5 and 6, the toilet seat 22 includes a body plate portion 36, an inner plate portion 38, and an outer plate portion 40.

The body plate portion 36 extends annularly with a width.

The inner plate portion 38 protrudes downward from an inner circumferential end of the body plate portion 36 and extends along the body plate portion 36, and an inner surface 3802 of the inner plate portion 38 forms an obtuse angle with respect to a lower surface 3602 of the body plate portion 36.

The outer plate portion 40 protrudes downward from an outer circumferential end of the body plate portion 36 and extends along the body plate portion 36, and an inner surface 4002 of the outer plate portion 40 forms an obtuse angle with respect to the lower surface 3602 of the body plate portion 36.

Note that, in the present technology, a lower surface 2210 of the toilet seat 22 includes: the lower surface 3602 of the body plate portion 36; the inner surface 3802 of the inner plate portion 38; and the inner surface 4002 of the outer plate portion 40.

As indicated with the hatched portion in FIG. 5, the cushion block 26 has a band-like shape and is positioned in the entire area of the lower surface 3602 of the body plate portion 36 in the circumferential direction.

The cushion block 26 is placed on an upper surface of the flange 30, and thus the toilet seat 22 is disposed on the flange 30.

For the cushion block 26, a material that suppresses sound generated by the rattling of the toilet seat 22 due to vibration during flight and sound generated by lowering the toilet seat 22 is used. For example, various materials such as rubber and a synthetic resin that are known in the related art may be used.

In the present embodiment, the cushion block 26 is formed of a single band-like body 42A that has a band-like shape extending with a predetermined width along an entire circumference of the toilet seat 22 in the circumferential direction.

The band-like body 42A has an elongated cross-sectional shape cut along with a plane orthogonal to the extension direction and includes: a flat upper surface 4202; a flat lower surface 4204; and inclined surfaces 4206 provided on both sides in the width direction.

The band-like body 42A has: the upper surface 4202 that is attached to the lower surface 3602 of the body plate portion 36 with an adhesive; and the inclined surfaces 4206 that form an obtuse angle θ with respect to the lower surface 3602 of the body plate portion 36.

Specifically, on both sides of the band-like body 42A in the width direction, which is brought into contact with the lower surface 3602 of the body plate portion 36, the inclined surfaces 4206 that form the obtuse angle θ with respect to the lower surface 3602 of the body plate portion 36 are provided. In a state in which the cushion block 26 is attached to the lower surface 2210 of the toilet seat 22, sections of outer surfaces of the cushion block 26, which are visible from the outside and are held in contact with the lower surface 2210 of the toilet seat 22, form the inclined surfaces 4206 that form the obtuse angle θ with respect to the lower surface 2210 of the toilet seat 22.

Figure 3:
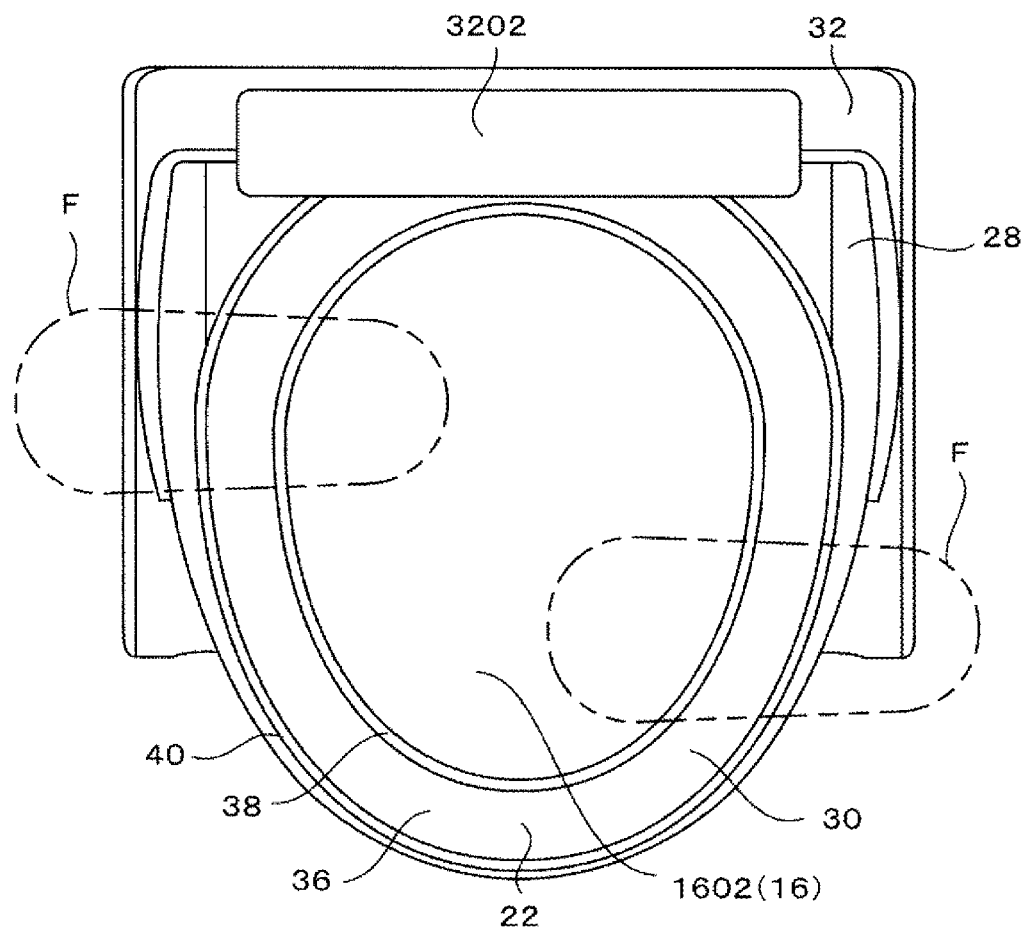
FIG. 3 is a plan view of the toilet from which a lid is removed.

According to the present embodiment, even when a user of the aircraft lavatory unit 10 places his or her foot on the toilet seat 22, or a user or a cleaner stands up on the toilet seat 22, specifically, steps on the toilet seat 22 with feet, as indicated with reference symbols F in FIGS. 3 and 5, the cushion block 26 is positioned almost in the entire area of the body plate portion 36 of the toilet seat 22 in the circumferential direction, and a load can be received directly by the cushion block 26, which is advantageous in preventing the breakage of the toilet seat 22.

Further, at the time of cleaning the aircraft lavatory unit 10, unlike the related art, corner portions between a base end of the cushion block 26 and the lower surface 3602 of the body plate portion 36 are not present. The sections of the outer surfaces of the cushion block 26, which are held in contact with the lower surface 2210 of the toilet seat 22, form the inclined surfaces 4206 that form the obtuse angle θ with respect to the lower surface 2210 of the toilet seat 22. With this, dirt is less likely to adhere to the boundary sections between the lower surface 3602 of the body plate portion 36 and the cushion block 26, and adhered dirt is easily removed, which are advantageous in improving the efficiency of clean-up work.

Note that the more the value of the obtuse angle θ is increased, the boundary sections between the outer surfaces of the cushion block 26 (the inclined surfaces 4206) and the lower surface 2210 of the toilet seat 22 (the lower surface 3602 of the body plate portion 36) are cleaned more easily, and adhered dirt is removed more easily.

Meanwhile, the more the value of the obtuse angle θ is increased, an outer circumferential edge of the cushion block is reduced in thickness, which is disadvantageous in the ease of molding and disadvantageous in the ease of handling. Further, the volume of the cushion block 26 that bears a load applied on the toilet seat 22 is reduced, which is not preferable for the durability of the cushion block 26.

As a result of diligent research by the inventors, it was revealed that, when the obtuse angle θ falls within a range of from 115 degrees to 145 degrees, the boundary sections between the outer surfaces of the cushion block 26 (the inclined surfaces 4206) and the lower surface 2210 of the toilet seat 22 (the lower surface 3602 of the body plate portion 36) are cleaned easily, adhered dirt is removed easily, and at the same time, the angle is preferable in the molding, handling, and durability of the cushion block 26.

Further, it was revealed that, particularly, when the obtuse angle θ falls within a range of from 125 degrees to 135 degrees, the boundary sections between the outer surfaces of the cushion block 26 (the inclined surfaces 4206) and the lower surface 2210 of the toilet seat 22 (the lower surface 3602 of the body plate portion 36) are cleaned easily, adhered dirt is removed easily, and at the same time, the angle is preferable in the molding, handling, and durability of the cushion block 26.

In the first embodiment, the obtuse angle θ illustrated in FIG. 6 is 135 degrees, and thus the boundary sections between the outer surfaces of the cushion block 26 and the lower surface 2210 of the toilet seat 22 is cleaned easily, adhered dirt is removed easily, and at the same time, the angle is preferable in the molding, handling, and durability of the cushion block 26.

Second Embodiment

Figure 7:
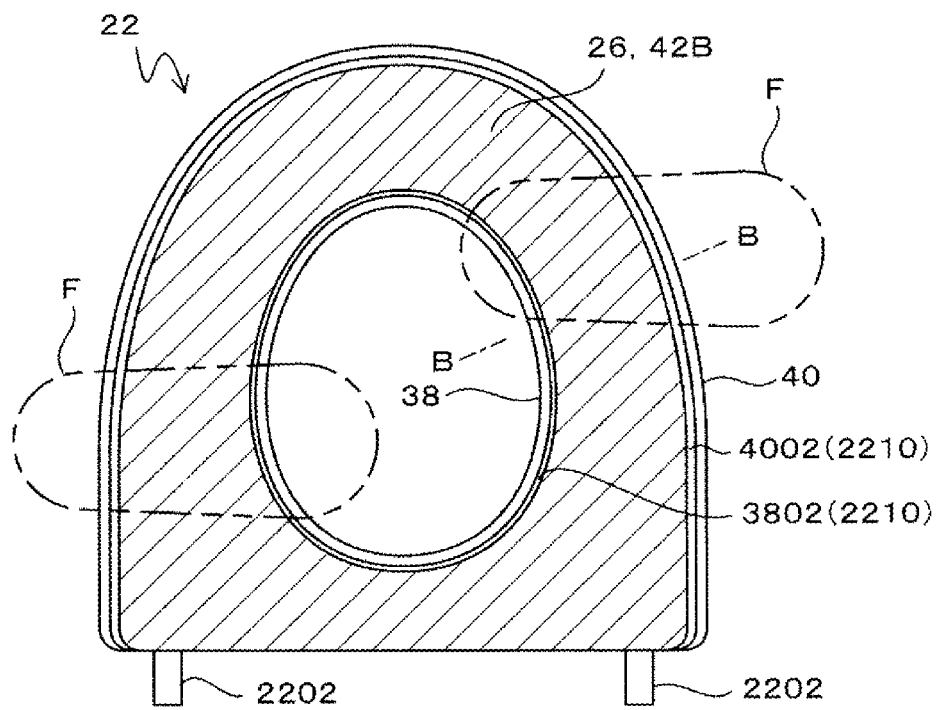
FIG. 7 is a diagram of a toilet seat according to a second embodiment, which is seen from below.

Next, a second embodiment is described with reference to FIGS. 7 and 8.

Note that, in the following embodiments, the same reference signs denote the same sections and members as those in the first embodiment, description therefor will be omitted, and differences are mainly described.

In the second embodiment, the cross-sectional shape of the cushion block 26 is different from that in the first embodiment.

A band-like body 42B forming the cushion block 26 is provided from the lower surface 3602 of the body plate portion 36 to the inner surface 3802 of the inner plate portion 38 and the inner surface 4002 of the outer plate portion 40.

Specifically, the band-like body 42B includes: the flat upper surface 4202 that is attached to the lower surface 3602 of the body plate portion 36; an inner inclined surface 4210 that is attached to the inner surface 3802 of the inner plate portion 38 with an adhesive; an outer inclined surface 4212 that is attached to the inner surface 4002 of the outer plate portion 40 with an adhesive; and the flat lower surface 4204.

In the second embodiment, the cushion block 26 may be formed by pouring a rubber material in a fluid condition onto the lower surface 2210 of the toilet seat 22. Alternatively, an upper surface of the cushion block 26 molded with a die may be attached to the lower surface 3602 of the body plate portion 36 with an adhesive.

A thickness t of the cushion block 26, which is a dimension between the upper surface 4202 and the lower surface 4204 is formed as a dimension that allows the lower surface 4204 to be positioned in the middle in a height direction between the inner plate portion 38 and the outer plate portion 40.

The inner surface 3802 of the inner plate portion 38 forms an obtuse angle with respect to the lower surface 3602 of the body plate portion 36, and the inner surface 4002 of the outer plate portion 40 forms an obtuse angle with respect to the lower surface 3602 of the body plate portion 36.

A section of the surface of the cushion block 26 (the flat lower surface 4204), which is held in contact with the inner surface 3802 of the inner plate portion 38 (the lower surface 2210 of the toilet seat 22), forms an inclined surface that forms the obtuse angle θ with respect to the inner surface 3802 of the inner plate portion 38 (the lower surface 2210 of the toilet seat 22).

Further, a section of the surface of the cushion block 26 (the flat lower surface 4204), which is held in contact with the inner surface 4002 of the outer plate portion 40 (the lower surface 2210 of the toilet seat 22), forms an inclined surface that forms the obtuse angle θ with respect to the inner surface 4002 of the outer plate portion 40 (the lower surface 2210 of the toilet seat 22).

Similarly in the first embodiment, the second embodiment is also advantageous in preventing the breakage of the toilet seat 22. Further, effects are exerted such that dirt is less likely to adhere to the boundary sections between the inner surface 3802 of the inner plate portion 38 and the inner surface 4002 of the outer plate portion 40 and the cushion block 26, that adhered dirt is removed easily, and that efficiency in clean-up work is advantageously improved.

Further, at the time of stepping on the toilet seat 22 with feet or sitting on the toilet seat 22, in a case where a load is applied to the toilet seat 22 in the width direction while sitting on the toilet seat 22, the load can be received by, in addition to an adhesion surface between the toilet seat 22 and the cushion block 26, the part that mechanically engages the inner plate portion 38 and the cushion block 26 with each other and the part that mechanically engages the outer plate portion 40 and the cushion block 26. Thus, this is advantageous in preventing the peeling off of the cushion block 26 and improving the durability of the cushion block 26.

Figure 8:
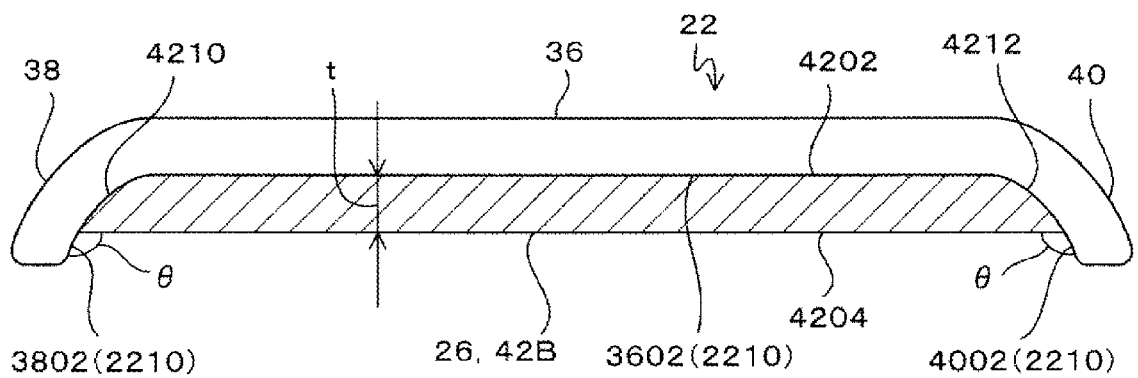
FIG. 8 is a cross-sectional view taken along B-B of FIG. 7.

In the second embodiment, as illustrated in FIG. 8, the obtuse angle θ that is formed between the outer surfaces of the cushion block 26 (the lower surface 4204 of the band-like body 42B) and the lower surface 2210 of the toilet seat 22 (the inner surface 3802 of the inner plate portion 38 and the inner surface 4002 of the outer plate portion 40) is 115 degrees. With this, the boundary section between the outer surfaces of the cushion block 26 (the lower surface 4204 of the band-like body 42B) and the lower surface 2210 of the toilet seat 22 (the inner surface 3802 of the inner plate portion 38 and the inner surface 4002 of the outer plate portion 40) is cleaned easily, adhered dirt is removed easily, and at the same time, the angle is preferable in the molding, handling, and durability of the cushion block 26.

Third Embodiment

Next, a third embodiment is described with reference to FIG. 9.

The cushion block 26 is formed by a plurality of divided band-like bodies 42C that are disposed on the lower surface 3602 of the body plate portion 36 of the toilet seat 22 at an interval in the circumferential direction.

The divided band-like body 42C has an elongated shape having a length L that extends along the toilet seat 22 in the circumferential direction and a width W that is smaller than the length in a direction orthogonal to the length. An interval D between the plurality of divided band-like bodies 42C in the circumferential direction of the toilet seat 22 is formed to have a dimension smaller than the width W. Therefore, the cushion block 26 is positioned almost in the entire area of the lower surface 2210 of the toilet seat 22 in the circumferential direction.

Similarly in the first embodiment, the divided band-like body 42C has an elongated cross-sectional shape cut along with a plane orthogonal to the extension direction.

Therefore, similarly in the first embodiment, as illustrated in FIG. 6, the divided band-like body 42C includes: the flat upper surface 4202 that is attached to the lower surface 3602 of the body plate portion 36 with an adhesive; the flat lower surface 4204; the inclined surface 4206 that connects the entire circumference around the upper surface 4202 and the entire circumference around the lower surface 4204.

Specifically, the inclined surface 4206 is provided to the entire circumference around the divided band-like body 42C that is brought into contact with the lower surface 2210 of the toilet seat 22. Similarly in the first embodiment, the inclined surface 4206 forms the obtuse angle θ with respect to the lower surface 2210 of the toilet seat 22.

Further, the interval D between the plurality of divided band-like bodies 42C in the circumferential direction of the toilet seat 22 is formed to have a dimension smaller than the width W of the divided band-like body 42C. Therefore, the cushion block 26 is positioned almost in the entire area of the lower surface 2210 of the toilet seat 22 in the circumferential direction.

Similarly in the first embodiment, the third embodiment is also advantageous in preventing breakage of the toilet seat 22. Further, effects are exerted such that dirt is less likely to adhere to the boundary sections between the lower surface 3602 of the body plate portion 36 and the cushion block 26, that adhered dirt is removed easily by a brush and the like, and that efficiency in clean-up work is advantageously improved.

Further, in the third embodiment, in a state in which the toilet seat 22 is placed on the flange 30 of the shroud 20 through the intermediation of the cushion block 26, between the body plate portion 36 of the toilet seat 22 and the flange 30 of the shroud 20, at a plurality of sections at an interval in the circumferential direction, air passageways 44A that communicate with the inner side and the outer side of the bowl portion 1602 are formed between ends of the divided band-like bodies 42C adjacent to each other in the circumferential direction of the toilet seat 22.

Thus, the plurality of air passageways 44A function so as to prevent the negative pressure acting on the human body seating portion to be drawn into the toilet body 16, together with the air passageways 35 of the shroud 20. This is advantageous in preventing the negative pressure at the time of discharging waste from drawing the human body seating portion into the toilet body 16.

Fourth Embodiment

Next, a fourth embodiment is described with reference to FIG. 10.

The fourth embodiment is a modified example of the third embodiment and is obtained by providing projection portions 4220 to ends of one divided band-like body 42D and groove portions 4222 to ends of another divided band-like body 42D in a length direction.

The inclined surface 4206 is provided to the entire circumference around the divided band-like body 42D including the projection portion 4220 or the groove portion 4222. Similarly in the first embodiment, the inclined surface 4206 form the obtuse angle θ with respect to the lower surface 2210 of the toilet seat 22.

Further, in a state in which upper surfaces of the plurality of divided band-like bodies 42D are attached to the lower surface 3602 of the body plate portion 36, in the divided band-like bodies 42D adjacent to each other in the circumferential direction of the toilet seat 22, the projection portion 4220 of the other divided band-like body 42D is positioned inward of the groove portion 4222 of the one divided band-like body 42D. Between the groove portions 4222 and the projection portions 4220, bent air passageways 44B that communicate with the inner side and the outer side of the bowl portion 1602 are formed.

The interval D between the projection portions 4220 and the groove portions 4222 of the plurality of divided band-like bodies 42D in the circumferential direction of the toilet seat 22 is formed to have a dimension smaller than the width W of the divided band-like body 42D. Therefore, the cushion block 26 is positioned almost in the entire area of the lower surface 2210 of the toilet seat 22 in the circumferential direction.

The similar effects as in the third embodiment are also exerted by the fourth embodiment.

Next, modified examples of the first, third, and fourth embodiments are described with reference to FIGS. 11 and 12.

In those modified example, on the lower surface of the toilet seat 22 and the upper surface of the cushion block 26 (the band-like body 42A, the divided band-like bodies 42C and 42D), which is attached to the lower surface, recess/protrusion portions 43 that extend in the circumferential direction of the toilet seat 22 and that are engaged with each other are provided.

Figure 11:
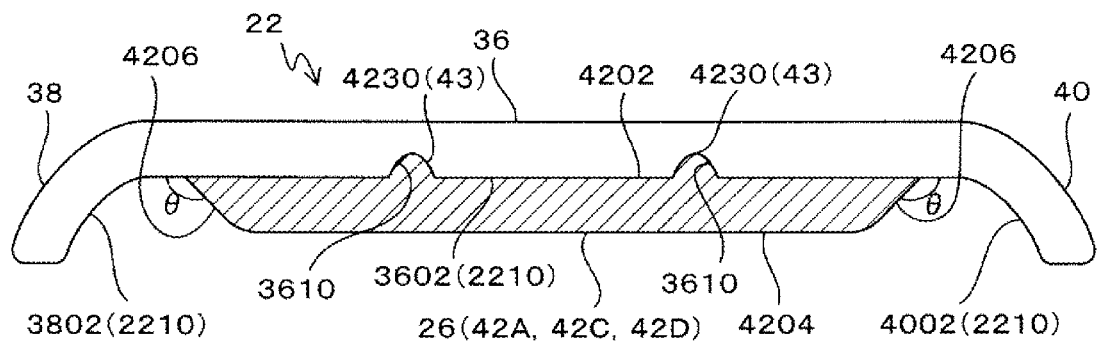
FIG. 11 is an explanatory diagram of a modified example of the first, third, and fourth embodiments.

In the modified example illustrated in FIG. 11, as the recess/protrusion portions 43, a plurality of recessed grooves 3610, which extend along the circumferential direction of the body plate portion 36, are provided in the lower surface 3602 of the body plate portion 36 at an interval in the width direction of the body plate portion 36. A plurality of protrusions 4230, which extend in the extension direction of the cushion block 26 and are engageable with the recessed grooves 3610, are provided on the upper surface 4202 of the cushion block 26 (the band-like body 42A, the divided band-like bodies 42C and 42D).

Figure 12:
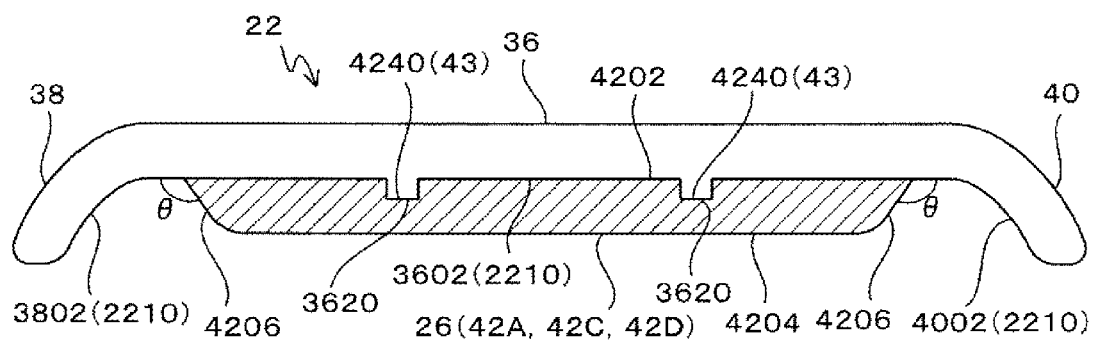
FIG. 12 is an explanatory diagram of a modified example of the first, third, and fourth embodiments.

In the modified example illustrated in FIG. 12, as the recess/protrusion portions 43, a plurality of protrusions 3620, which extend along the circumferential direction of the body plate portion 36, are provided on the lower surface 3602 of the body plate portion 36 at an interval in the width direction of the body plate portion 36. A plurality of recessed grooves 4240, which extend in the extension direction of the cushion block 26 and are engageable with the protrusions 3620, are provided in the upper surface 4202 of the cushion block 26 (the band-like body 42A, the divided band-like bodies 42C and 42D).

Figure 13:
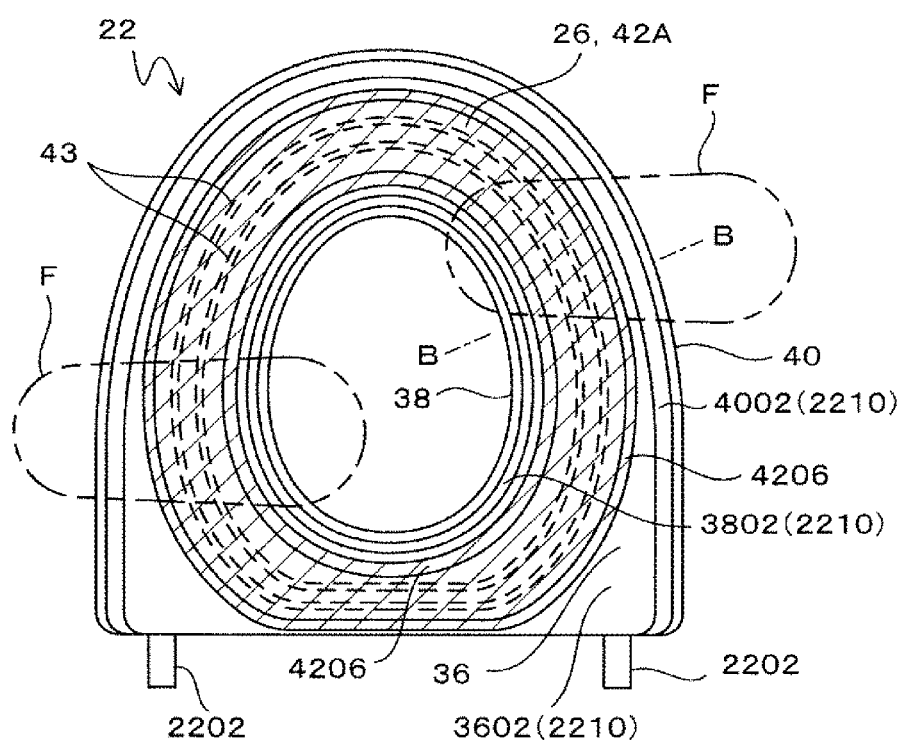
FIG. 13 is an explanatory diagram of the modified example of the first embodiment and is a view of the toilet seat seen from below.
Figure 14:
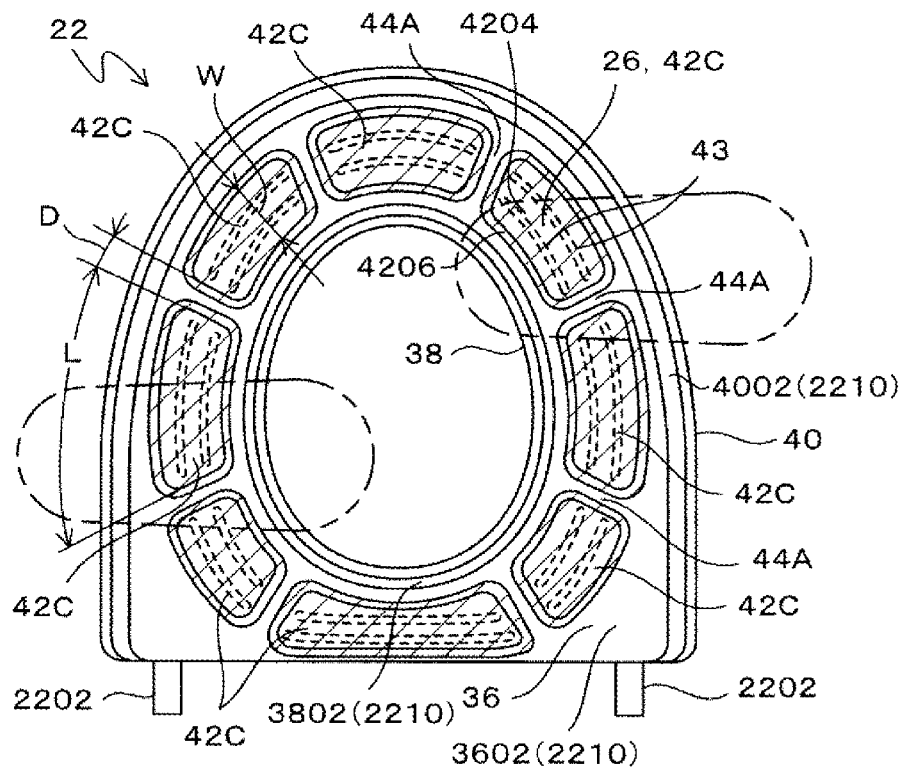
FIG. 14 is an explanatory diagram of the modified example of the third embodiment and is a view of the toilet seat seen from below.
Figure 15:
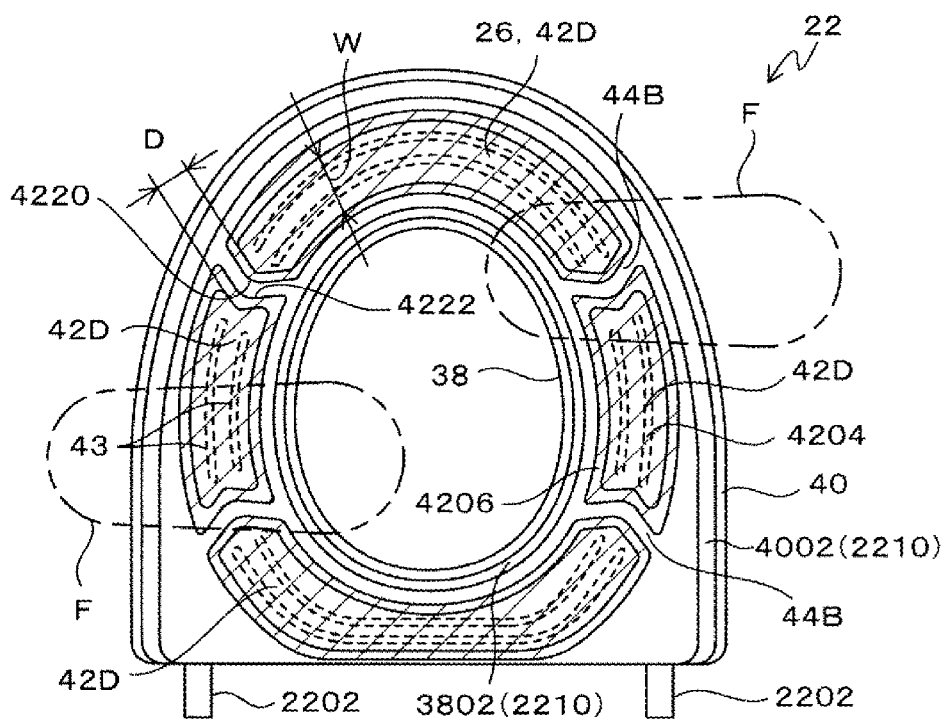
FIG. 15 is an explanatory diagram of the modified example of the fourth embodiment and is a view of the toilet seat seen from below.

In this case, as illustrated in FIGS. 13 to 15, in a plan view of the cushion block 26 (the band-like body 42A, the divided band-like bodies 42C and 42D) in a state of being attached to the lower surface 3602 of the body plate portion 36, each of the recess/protrusion portions 43 is formed to have a dimension positioned inward of the contour of the cushion block 26 (the band-like body 42A, the divided band-like bodies 42C and 42D), in other words, a dimension hidden by the cushion block 26 (the band-like body 42A, the divided band-like bodies 42C and 42D).

According to those modified examples, when the recess/protrusion portions 43 are engaged with each other, the cushion block 26 (the band-like body 42A, the divided band-like bodies 42C and 42D) can be positioned easily with respect to the lower surface 3602 of the body plate portion 36, which is advantageous in performing attachment work for the cushion block 26 (the band-like body 42A, the divided band-like bodies 42C and 42D) easily.

Further, the adhesion area of the cushion block 26 with respect to the lower surface 3602 of the body plate portion 36 of the toilet seat 22 can be increased. Further, the structure in which the part of the cushion block 26 and the part of the toilet seat 22 are mechanically engaged with each other is adopted. Thus, at the time of stepping on the toilet seat 22 with feet or sitting on the toilet seat 22, in a case where a load is applied to the toilet seat 22 in the width direction under a state of sitting on the toilet seat 22, the load can be received by, in addition to the adhesion surface between the body plate portion 36 and the cushion block 26, the part of the cushion block 26 and the part of the toilet seat 22 that are mechanically engaged with each other. Thus, this is advantageous in preventing the peeling off of the cushion block 26 and improving the durability of the cushion block 26.

Further, in the modified example illustrated in FIG. 11, the obtuse angle θ formed between the outer surfaces of the cushion block 26 (the inclined surfaces 4206 of the band-like body 42A, the divided band-like bodies 42C and 42D) and the lower surface 2210 of the toilet seat 22 (the lower surface 3602 of the body plate portion 36) is 135 degrees. In the modified example illustrated in FIG. 12, the obtuse angle θ is 125 degrees. The boundary sections between the outer surfaces of the cushion block 26 (the inclined surfaces 4206 of the band-like body 42A, the divided band-like bodies 42C and 42D) and the lower surface 2210 of the toilet seat 22 (the lower surface 3602 of the body plate portion 36) are cleaned easily, adhered dirt is removed easily, and at the same time, the angle is preferable in the molding, handling, and durability of the cushion block 26.

Next, another modified example of the first, third, and fourth embodiments is described with reference to FIG. 16.

Figure 16:
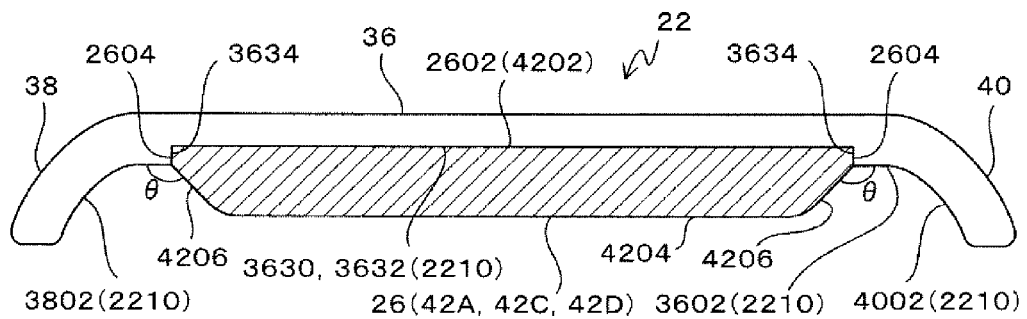
FIG. 16 is an explanatory diagram of another modified example of the first, third, and fourth embodiments.

In the modified example illustrated in FIG. 16, in the lower surface 2210 of the toilet seat 22, a recess 3630 extending in the circumferential direction of the toilet seat 22 and opening downward is provided, and an upper part of the cushion block 26 (the band-like body 42A, the divided band-like bodies 42C and 42D) is inserted therein.

In this modified example, the lower surface 2210 of the toilet seat 22 includes a bottom surface 3632 of the recess 3630.

The recess 3630 is formed to have a dimension that allows the upper part of the cushion block 26 (the band-like body 42A, the divided band-like bodies 42C and 42D) to be fitted therein without rattling.

Further, in the modified examples of the first embodiment, which are illustrated in FIGS. 5 and 6, an upper surface 2602 (the upper surface 4202 of the band-like body 42A) of the upper part of the cushion block 26 (the band-like body 42A) is attached to the bottom surface of 3632 of the recess 3630, and side surfaces 2604 of the upper part of the cushion block 26 (the band-like body 42A) on both sides are attached to side surfaces 3634 of the recess 3630.

Figure 9:
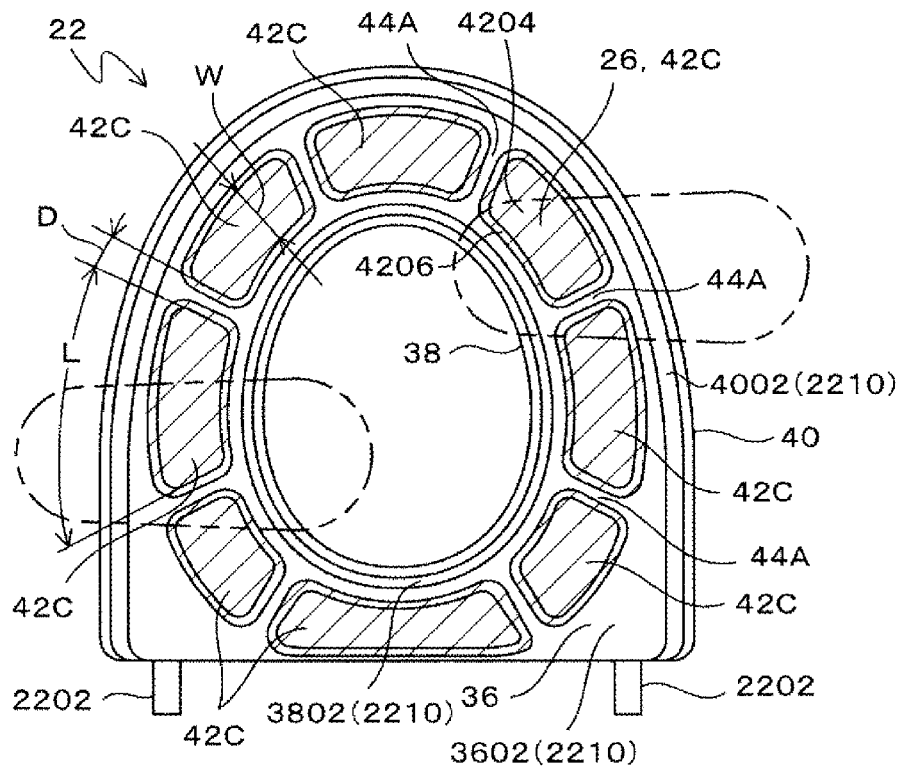
FIG. 9 is a diagram of a toilet seat according to a third embodiment, which is seen from below.
Figure 10:
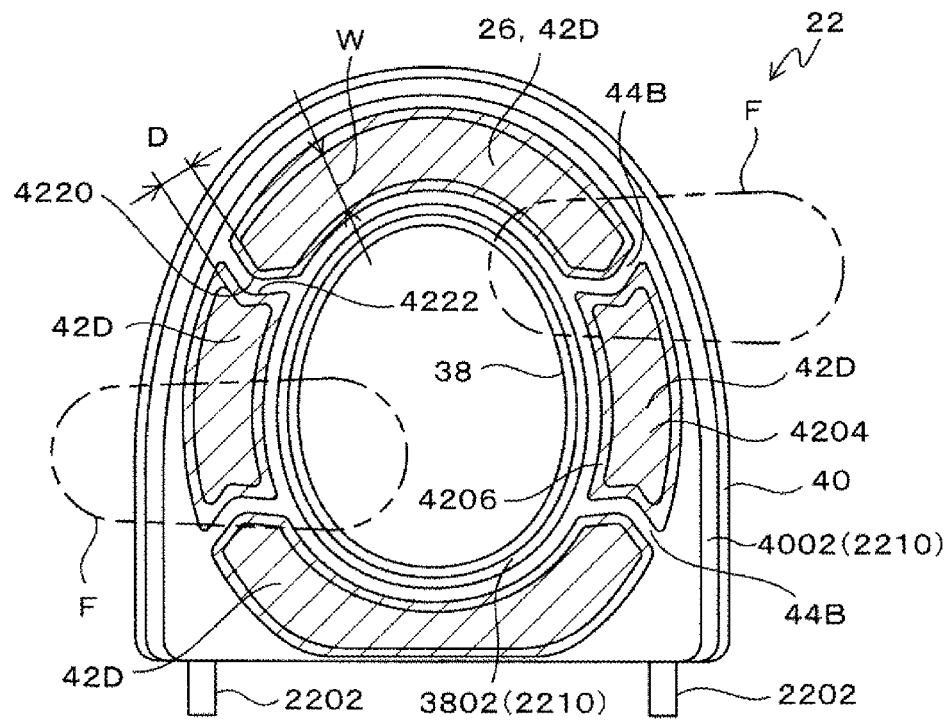
FIG. 10 is a diagram of a toilet seat according to a fourth embodiment, which is seen from below.

Further, in the modified example of the third embodiment, which is illustrated in FIG. 9, and the modified example of the fourth embodiment, which is illustrated in FIG. 10, the upper surface 2602 (the upper surface 4202 of the band-like body 42A) of the upper part of the cushion block 26 (the divided band-like bodies 42C and 42D) is attached to the bottom surface of 3632 of the recess 3630 with an adhesive, and the entire area of the periphery of the upper part of the cushion block 26 (the divided band-like bodies 42C and 42D) is attached to the side surfaces 3634 of the recess 3630 with an adhesive.

According to those modified examples, when the upper part of the cushion block 26 (the band-like body 42A, the divided band-like bodies 42C and 42D) is inserted into the recess 3630, the cushion block 26 (the band-like body 42A, the divided band-like bodies 42C and 42D) can be positioned easily with respect to the lower surface 3602 of the body plate portion 36, which is advantageous in performing attachment work for the cushion block 26 (the band-like body 42A, the divided band-like bodies 42C and 42D) easily.

Further, the adhesion area of the cushion block 26 with respect to the lower surface 3602 of the body plate portion 36 of the toilet seat 22 can be increased. Further, the structure in which the part of the cushion block 26 and the part of the toilet seat 22 are mechanically engaged with each other is adopted. Thus, at the time of stepping on the toilet seat 22 with feet or sitting on the toilet seat 22, in a case where a load is applied to the toilet seat 22 in the width direction under a state of sitting on the toilet seat 22, the load can be received by, in addition to the adhesion surface between the body plate portion 36 and the cushion block 26, the part of the cushion block 26 and the part of the toilet seat 22 that are mechanically engaged with each other. Thus, this is advantageous in preventing the peeling off of the cushion block 26 and improving the durability of the cushion block 26.

Further, the obtuse angle θ formed between the outer surfaces of the cushion block 26 (the inclined surfaces 4206 of the band-like body 42A and the divided band-like bodies 42C and 42D) and the lower surface 2210 of the toilet seat 22 (the lower surface 3602 of the body plate portion 36 without the recess 3630) is 135 degrees. The boundary sections between the outer surfaces of the cushion block 26 (the inclined surfaces 4206 of the band-like body 42A and the divided band-like bodies 42C and 42D) and the lower surface 2210 of the toilet seat 22 (the lower surface 3602 of the body plate portion 36 without the recess 3630) are cleaned easily, adhered dirt is removed easily, and at the same time, the angle is preferable in the molding, handling, and durability of the cushion block 26.

Fifth Embodiment

Figure 17:
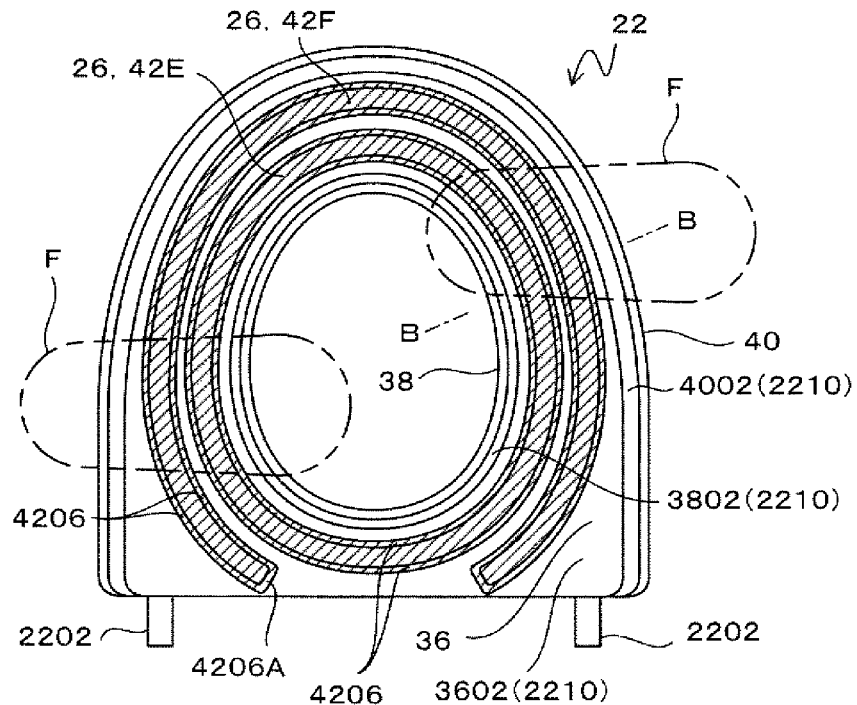
FIG. 17 is a diagram of a toilet seat according to a fifth embodiment, which is seen from below.

Next, a fifth embodiment is described with reference to FIGS. 17 and 18.

The fifth embodiment is a modified example of the first embodiment, the cushion block 26 includes an inner band-like body 42E and an outer band-like body 42F.

As the cushion block 26, the inner band-like body 42E extends in a band-like shape at a section close to an inner circumference of the lower surface 3602 of the body plate portion 36, and the outer band-like body 42F extends in a band-like shape at a section close to an outer circumference of the lower surface 3602 of the body plate portion 36.

The inner band-like body 42E and the outer band-like body 42F have width in a direction orthogonal to a direction in which the band-like bodies 42E and 42F extend.

The inner band-like body 42E extends annularly and includes: the flat upper surface 4202 that is attached to the lower surface 3602 of the body plate portion 36 with an adhesive; the flat lower surface 4204; and the inclined surfaces 4206 provided on both sides in the width direction.

The outer band-like body 42F extends annularly outward of the inner band-like body 42E in the width direction of the body plate portion 36, and both ends of the outer band-like body 42F in the extension direction are separate from each other and face each other at positions close to the forked portions 2202, specifically, at parts close to the positions at which the toilet seat 22 is attached to the attachment portion 3202 of the shroud 20 in a swingable manner.

The outer band-like body 42F includes: the flat upper surface 4202 that is attached to the lower surface 3602 of the body plate portion 36 with an adhesive; the flat lower surface 4204; the inclined surfaces 4206 on both sides in the width direction and further includes inclined surfaces 4206A on both ends of the outer band-like body 42F in the extension direction. The inclined surfaces 4206A on both the ends of the outer band-like body 42F in the extension direction are provided continuously to the inclined surfaces 4206.

In the fifth embodiment, the inner band-like body 42E is positioned in the entire circumference of the lower surface 3602 of the body plate portion 36, and the outer band-like body 42F extends outward, and hence the cushion block 26 is positioned on the toilet seat 22 in the width direction at any position in the circumferential direction of the toilet seat 22. Thus, similarly in the first embodiment, even when the toilet seat 22 is stepped on with feet, the load can be received directly by the cushion block 26, which is advantageous in preventing the breakage of the toilet seat 22. Further, effects are exerted such that dirt is less likely to adhere to the boundary sections between the lower surface 3602 of the body plate portion 36 and the cushion block 26, that adhered dirt is removed easily by a brush and the like, and that efficiency in clean-up work is advantageously improved.

Figure 18:
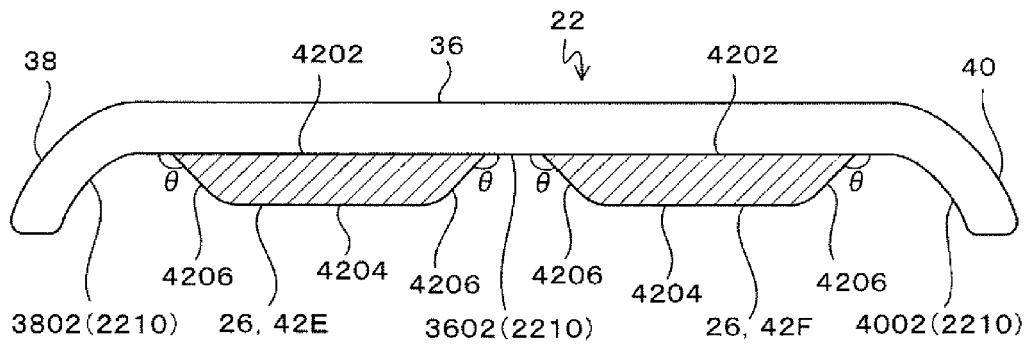
FIG. 18 is a cross-sectional view taken along B-B of FIG. 17.

Further, as illustrated in FIG. 18, the obtuse angle θ formed between the outer surfaces of the cushion block 26 (the inclined surfaces 4206 of the inner band-like body 42E and the outer band-like body 42F) and the lower surface 2210 of the toilet seat 22 (the lower surface 3602 of the body plate portion 36) is 135 degrees, the boundary sections between the outer surfaces of the cushion block 26 (the inclined surfaces 4206 of the inner band-like body 42E and the outer band-like body 42F) and the lower surface 2210 of the toilet seat 22 (the lower surface 3602 of the body plate portion 36) are cleaned easily, adhered dirt is removed easily, and at the same time, the angle is preferable in the molding, handling, and durability of the cushion block 26.

Note that, in the fifth embodiment, the case where the cushion block 26 is formed of the two band-like bodies that are the inner band-like body 42E and the outer band-like body 42F is described. However, one or two or more intermediate band-like bodies may further be provided between the inner band-like body 42E and the outer band-like body 42F.

Figure 19:
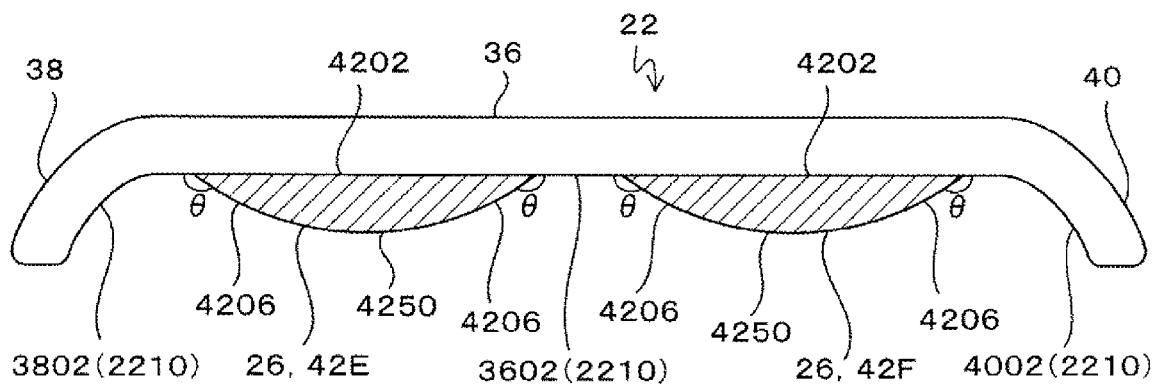
FIG. 19 is an explanatory diagram of a modified example of the fifth embodiment.

Next, a modified example of the fifth embodiment is described with reference to FIG. 19.

This modified example is different from the fifth embodiment in that, when the inner band-like body 42E and the outer band-like body 42F are cut along a plane orthogonal to the extension direction, the inner band-like body 42E and the outer band-like body 42F are formed to have curved surfaces 4250 protruding downward.

Also in this case, the inclined surfaces 4206 and 4206A that form the obtuse angle θ with respect to the lower surface 3602 of the body plate portion 36 are provided on both sides of the inner band-like body 42E in the width direction, both sides of the outer band-like body 42F in the width direction, and both ends of the outer band-like body 42F in the extension direction, and similar effects as those in the fifth embodiment can be exerted.

In this modified example, the obtuse angle θ formed between the outer surfaces of the cushion block 26 (the curved surfaces 4250 forming the inclined surfaces 4206 of the inner band-like body 42E and the outer band-like body 42F) and the lower surface 2210 of the toilet seat 22 (the lower surface 3602 of the body plate portion 36) is 145 degrees, the boundary sections between the outer surfaces of the cushion block 26 (the curved surfaces 4250 forming the inclined surfaces of the inner band-like body 42E and the outer band-like body 42F) and the lower surface 2210 of the toilet seat 22 (the lower surface 3602 of the body plate portion 36) are cleaned easily, adhered dirt is removed easily, and at the same time, the angle is preferable in the molding, handling, and durability of the cushion block 26. Note that, in this case, the obtuse angle θ is an angle formed between tangent lines of the curved surfaces 4250, at crossing points of the outer surfaces of the cushion block 26 (the curved surfaces 4250 forming the inclined surfaces 4206 of the inner band-like body 42E and the outer band-like body 42F) and the lower surface 2210 of the toilet seat 22 (the lower surface 3602 of the body plate portion 36), and the lower surface 2210 of the toilet seat 22 (the lower surface 3602 of the body plate portion 36).

Next, other modified examples of the fifth embodiment are described with reference to FIGS. 20 and 21.

In those modified example, on the lower surface of the toilet seat 22 and the upper surface of the cushion block 26 (the inner band-like body 42E and the outer band-like body 42F), which is attached to the lower surface, the recess/protrusion portions 43 that extend in the circumferential direction of the toilet seat 22 and that are engaged with each other are provided.

Figure 20:
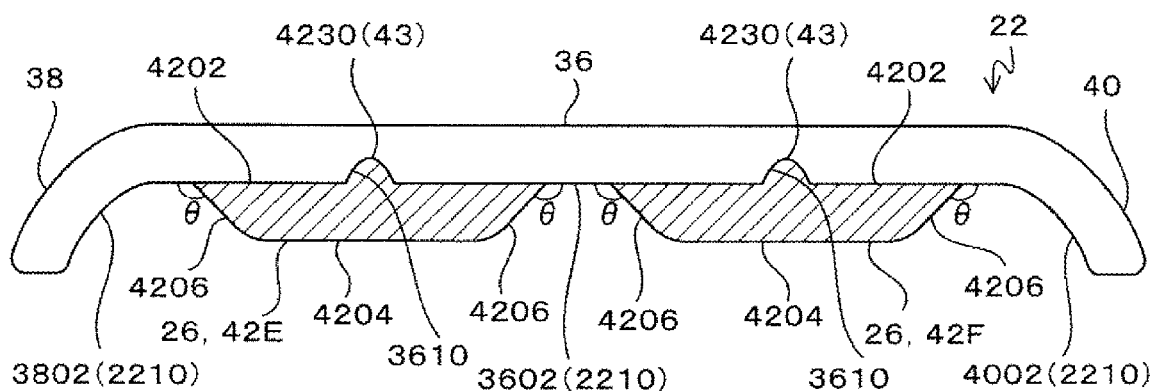
FIG. 20 is an explanatory diagram of another modified example of the fifth embodiment.

In the modified example illustrated in FIG. 20, as the recess/protrusion portions 43, the plurality of recessed grooves 3610, which extend along the circumferential direction of the body plate portion 36, are provided in the lower surface 3602 of the body plate portion 36 at an interval in the width direction of the body plate portion 36. The plurality of protrusions 4230, which extend in the extension direction of the cushion block 26 and are engageable with the recessed grooves 3610, are provided on the upper surface 4202 of the cushion block 26.

Figure 21:
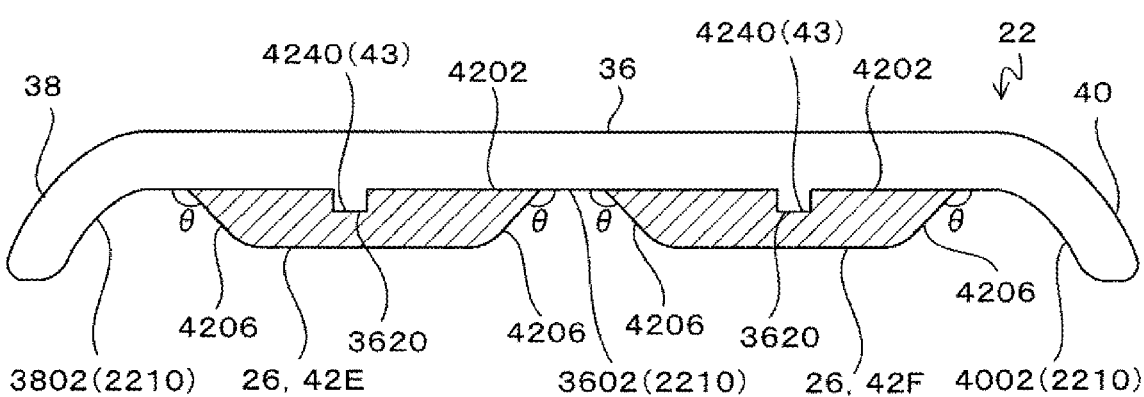
FIG. 21 is an explanatory diagram of another modified example of the fifth embodiment.

Further, in the modified example illustrated in FIG. 21, as the recess/protrusion portions 43, the plurality of protrusions 3620, which extend along the circumferential direction of the body plate portion 36, are provided on the lower surface 3602 of the body plate portion 36 at an interval in the width direction of the body plate portion 36. The plurality of recessed grooves 4240, which extend in the extension direction of the cushion block 26 and are engageable with the protrusions 3620, are provided in the lower surfaces 4204 of the inner band-like body 42E and the outer band-like body 42F.

Figure 22:
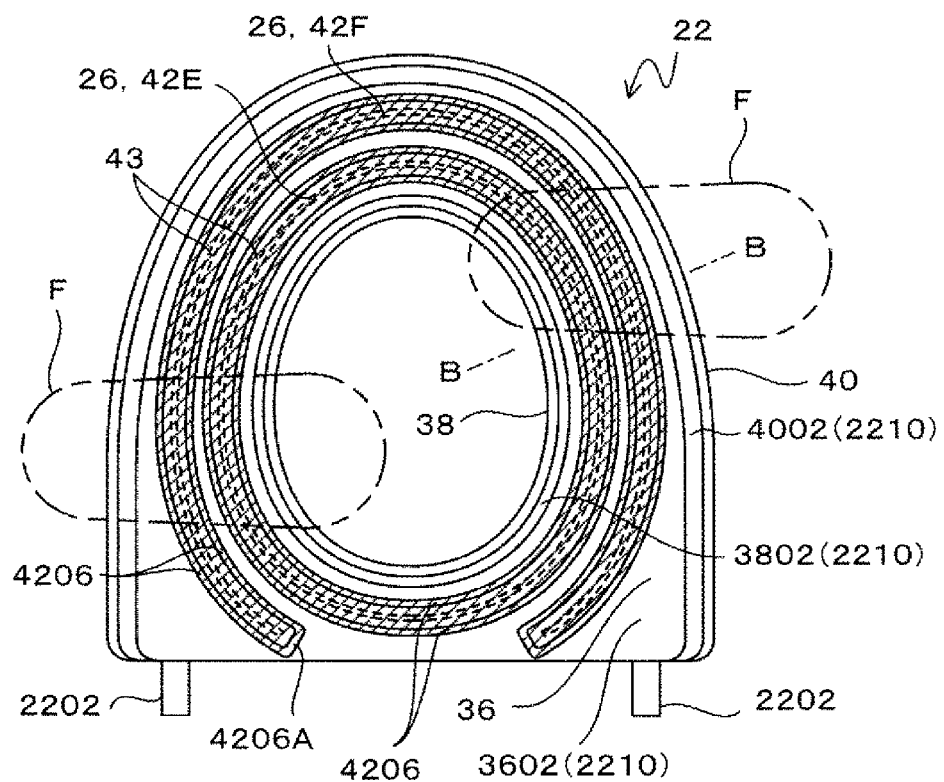
FIG. 22 is an explanatory diagram of the modified example of the fifth embodiment and is a view of the toilet seat seen from below.

In this case, as illustrated in FIG. 22, in a plan view of the cushion block 26 (the inner band-like body 42E and the outer band-like body 42F) in a state of being attached to the lower surface 3602 of the body plate portion 36, each of the recess/protrusion portions 43 is formed to have a dimension positioned inward of the contour of the cushion block 26 (the inner band-like body 42E and the outer band-like body 42F), in other words, a dimension hidden by the cushion block 26 (the inner band-like body 42E and the outer band-like body 42F).

According to those modified examples, when the recess/protrusion portions 43 are engaged with each other, the cushion block 26 (the inner band-like body 42E and the outer band-like body 42F) can be positioned easily with respect to the lower surface 3602 of the body plate portion 36, which is advantageous in performing attachment work for the cushion block 26 (the inner band-like body 42E and the outer band-like body 42F).

Further, the adhesion areas between the inner band-like body 42E and the outer band-like body 42F, and the lower surface 3602 of the body plate portion 36 of the toilet seat 22 can be increased. Further, the structure in which the parts of the inner band-like body 42E and the outer band-like body 42F and the parts of the toilet seat 22 are mechanically engaged with each other is adopted. Thus, at the time of stepping on the toilet seat 22 with feet or sitting on the toilet seat 22, in a case where a load is applied to the toilet seat 22 in the width direction under a state of sitting on the toilet seat 22, the load can be received by, in addition to the adhesion surfaces between the body plate portion 36 and the inner band-like body 42E and the outer band-like body 42F, the parts of the inner band-like body 42E and the outer band-like body 42F and the parts of the toilet seat 22 that are mechanically engaged with each other. Thus, this is advantageous in preventing the peeling off of the inner band-like body 42E and the outer band-like body 42F and improving the durability of the cushion block 26.

Further, in the modified example illustrated in FIG. 20, the obtuse angle θ formed between the outer surfaces of the cushion block 26 (the inclined surfaces 4206 of the inner band-like body 42E and the outer band-like body 42F) and the lower surface 2210 of the toilet seat 22 (the lower surface 3602 of the body plate portion 36) is 135 degrees. In the modified example illustrated in FIG. 21, the obtuse angle θ is 135 degrees. The boundary sections between the outer surfaces of the cushion block 26 (the inclined surfaces 4206 of the inner band-like body 42E and the outer band-like body 42F) and the lower surface 2210 of the toilet seat 22 (the lower surface 3602 of the body plate portion 36) are cleaned easily, adhered dirt is removed easily, and at the same time, the angle is preferable in the molding, handling, and durability of the cushion block 26.

Next, another modified example of the fifth embodiment is described with reference to FIG. 23.

Figure 23:
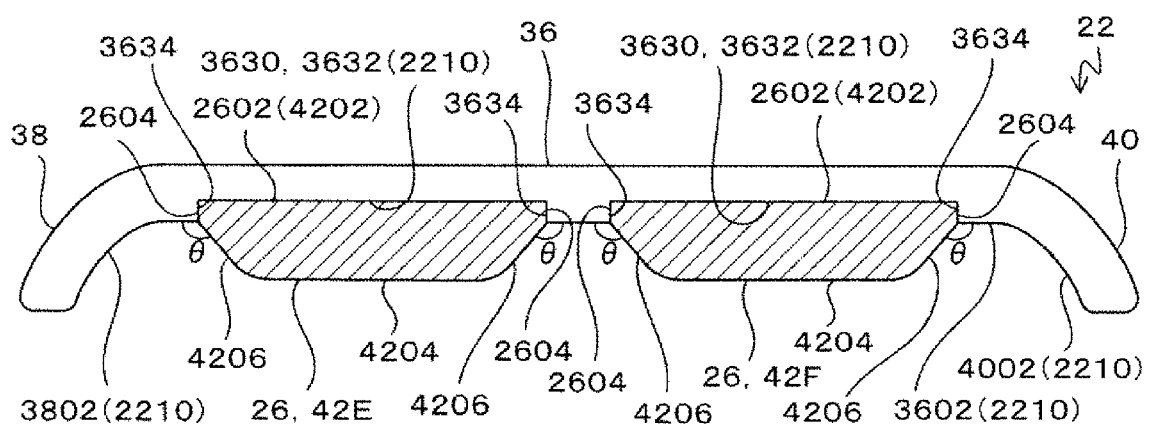
FIG. 23 is an explanatory diagram of further another modified example of the fifth embodiment.

In the modified example illustrated in FIG. 23, in the lower surface 2210 of the toilet seat 22, a plurality of the recesses 3630 extending in the circumferential direction of the toilet seat 22 at an interval in the width direction of the toilet seat 22 and opening downward are provided, and an upper part of the inner band-like body 42E and an upper part of the outer band-like body 42F are inserted therein.

The plurality of recesses 3630 are formed to have a dimension that allows the upper part of the cushion block 26 (the inner band-like body 42E and the outer band-like body 42F) to be fitted therein without rattling.

In this modified example, the lower surface 2210 of the toilet seat 22 includes the bottom surface 3632 of the recess 3630.

Further, the upper surfaces 2602 (the upper surfaces 4202) of the upper parts of the inner band-like body 42E and the outer band-like body 42F are attached to the bottom surfaces 3632 of the recesses 3630 with an adhesive, and the side surfaces 2604 of the upper parts of the inner band-like body 42E and the outer band-like body 42F on both sides are attached to the side surfaces 3634 of the recesses 3630 with an adhesive.

According to this modified example, when the upper part of the cushion block 26 (the inner band-like body 42E and the outer band-like body 42F) is inserted into the recesses 3630, the cushion block 26 (the inner band-like body 42E and the outer band-like body 42F) can be positioned easily with respect to the lower surface 3602 of the body plate portion 36, which is advantageous in performing attachment work for the cushion block 26 (the inner band-like body 42E and the outer band-like body 42F).

Further, the adhesion areas of the inner band-like body 42E and the outer band-like body 42F with respect to the lower surface 3602 of the body plate portion 36 of the toilet seat 22 can be increased. Further, the structure in which the parts of the inner band-like body 42E and the outer band-like body 42F and the parts of the toilet seat 22 are mechanically engaged with each other is adopted. Thus, at the time of stepping on the toilet seat 22 with feet or sitting on the toilet seat 22, in a case where a load is applied to the toilet seat 22 in the width direction under a state of sitting on the toilet seat 22, the load can be received by, in addition to the adhesion surfaces between the body plate portion 36 and the inner band-like body 42E and the outer band-like body 42F, the part of the inner band-like body 42E and the part of the outer band-like body 42F and the parts of the toilet seat 22 that are mechanically engaged with each other. Thus, this is advantageous in preventing the peeling off of the cushion block 26 and improving the durability of the cushion block 26.

Further, the obtuse angle θ formed between the outer surfaces of the cushion block 26 (the inclined surfaces 4206 of the inner band-like body 42E and the outer band-like body 42F) and the lower surface 2210 of the toilet seat 22 (the lower surface 3602 of the body plate portion 36 without the recess 3630) is 130 degrees, the boundary sections between the outer surfaces of the cushion block 26 (the inclined surfaces 4206 of the inner band-like body 42E and the outer band-like body 42F) and the lower surface 2210 of the toilet seat 22 (the lower surface 3602 of the body plate portion 36 without the recess 3630) are cleaned easily, adhered dirt is removed easily, and at the same time, the angle is preferable in the molding, handling, and durability of the cushion block 26.

The invention claimed is:

1. A toilet seat structure for an aircraft lavatory unit, comprising:
   a toilet body including a bowl portion;
   a support portion configured to support the toilet body above a floor;

a shroud including:
a peripheral wall portion configured to cover a periphery of the toilet body and the support portion and
a flange having an annular shape placed on an upper end outer circumference of the bowl portion; and
a toilet seat having an annular shape placed on the flange, the toilet seat having a lower surface to which a cushion block is attached,
the cushion block having a band-like shape, having an upper surface attached to the lower surface of the toilet seat, and positioned almost in an entire area of the toilet seat in a circumference direction, and
in a state in which the cushion block is attached to the lower surface of the toilet seat, a section of an outer surface of the cushion block that is brought into contact with the lower surface of the toilet seat forms an inclined surface forming an obtuse angle θ with respect to the lower surface of the toilet seat;
wherein recess/protrusion portions are provided to the lower surface of the toilet seat and the upper surface of the cushion block to be attached to the lower surface, the recess/protrusion portions extending continuously around a circumference of the toilet seat and being engaged with each other.

2. The toilet seat structure for an aircraft lavatory unit according to claim 1, wherein
the cushion block is formed of a single band-like body having a band-like shape extending with a predetermined width along an entire circumference of the toilet seat in the circumference direction, and
the inclined surface is provided to each of both sides of the band-like body in a width direction.

3. The toilet seat structure for an aircraft lavatory unit according to claim 1, wherein
the toilet seat comprises:
a body plate portion extending annularly with a width and facing the flange;
an inner plate portion protruding downward from an inner circumferential end of the body plate portion and extending along the body plate portion; and
an outer plate portion protruding downward from an outer circumferential end of the body plate portion and extending along the body plate portion,
the lower surface of the toilet seat comprises:
a lower surface of the body plate portion;
an inner surface of the inner plate portion; and
an inner surface of the outer plate portion,
the cushion block is formed of a single band-like body having a band-like shape extending along an entire circumference of the toilet seat in the circumference direction,
the band-like body comprises:
a flat upper surface attached to the lower surface of the body plate portion;
an inner inclined surface attached to the inner surface of the inner plate portion;
an outer inclined surface attached to the inner surface of the outer plate portion; and
a flat lower surface, and
the lower surface of the band-like body forms the inclined surface forming an obtuse angle θ with respect to the inner surface of the inner plate portion and the inner surface of the outer plate portion of the toilet seat.

4. The toilet seat structure for an aircraft lavatory unit according to claim 1, wherein
the cushion block is formed of a plurality of divided band-like bodies disposed at an interval in the circumference direction of the toilet seat,
the plurality of divided band-like bodies each have an elongated shape having a length extending along the circumference direction of the toilet seat and a width having a dimension smaller than the length in a direction orthogonal to the length,
the interval between the plurality of divided band-like bodies in the circumference direction of the toilet seat has a dimension smaller than the width, and
the inclined surface is provided to an entire circumference around each of the plurality of divided band-like bodies being brought into contact with the lower surface of the toilet seat.

5. The toilet seat structure for an aircraft lavatory unit according to claim 4, wherein
projection portions are provided to ends of one of the plurality of divided band-like bodies in a length direction, and groove portions are provided to ends of another of the plurality of divided band-like bodies in the length direction, and
of divided band-like bodies adjacent to each other in the circumference direction of the toilet seat, a projection portion of the other of the plurality of divided band-like bodies is positioned inward of a groove portion of the one of the plurality of divided band-like bodies.

6. The toilet seat structure for an aircraft lavatory unit according to claim 1, wherein
the cushion block is formed of an inner band-like body having a band-like shape extending at a section close to an inner circumference of the lower surface of the toilet seat and an outer band-like body having a band-like shape extending at a section close to an outer circumference of the lower surface of the toilet seat,
the inner band-like body and the outer band-like body have a width in a direction orthogonal to a direction in which the inner band-like body and the outer band-like body extend, and
the inclined surface is provided to each of both sides of the inner band-like body in a width direction and to each of both sides of the outer band-like body in a width direction.

7. The toilet seat structure for an aircraft lavatory unit according to claim 6, wherein
both ends of the outer band-like body in an extension direction are away from each other and face each other at sections close to parts at which the toilet seat is attached to an attachment portion of the shroud in a swingable manner, and
the inclined surface is provided to each of both the ends of the outer band-like body in the extension direction, in addition to each of both sides of the outer band-like body in the width direction.

8. The toilet seat structure for an aircraft lavatory unit according to claim 1, wherein
in the lower surface of the toilet seat, a recess extending in the circumference direction of the toilet seat and opening downward is provided, and an upper part of the cushion block is inserted in the recess,
the lower surface of the toilet seat comprises a bottom surface of the recess, and
the lower surface of the toilet seat including the inclined surface forming an obtuse angle θ is the lower surface of the toilet seat without the recess.

9. The toilet seat structure for an aircraft lavatory unit according to claim 1, wherein the obtuse angle θ falls within a range of from 115 degrees to 145 degrees.

10. The toilet seat structure for an aircraft lavatory unit according to claim 1, wherein the obtuse angle θ falls within a range of from 125 degrees to 135 degrees.

11. The toilet seat structure for an aircraft lavatory unit according to claim 7, wherein
- in the lower surface of the toilet seat, a recess extending in the circumference direction of the toilet seat and opening downward is provided, and an upper part of the cushion block is inserted in the recess,
- the lower surface of the toilet seat comprises a bottom surface of the recess, and
- the lower surface of the toilet seat including the inclined surface forming an obtuse angle θ is the lower surface of the toilet seat without the recess.

12. The toilet seat structure for an aircraft lavatory unit according to claim 11, wherein the obtuse angle θ falls within a range of from 115 degrees to 145 degrees.

13. The toilet seat structure for an aircraft lavatory unit according to claim 12, wherein the obtuse angle θ falls within a range of from 125 degrees to 135 degrees.

\* \* \* \* \*